United States Patent [19]

Fahn et al.

[11] 3,755,183

[45] Aug. 28, 1973

[54] METHOD OF PREPARING SILICATE ADSORBENTS AND DRYING AGENTS AND PRODUCT THEREOF

[75] Inventors: Rudolf Fahn; Richard Amberger, both of Moosburg, Upper Bavaria, Germany

[73] Assignee: Sud-Chemie AG, Munich, Germany

[22] Filed: July 8, 1971

[21] Appl. No.: 160,894

[30] Foreign Application Priority Data

July 24, 1970 Germany.................. P 20 36 819.8

[52] U.S. Cl.................. 252/194, 252/179, 252/454, 252/455 R, 252/457, 252/459, 252/317, 423/327, 423/331, 423/332, 423/333
[51] Int. Cl. ...................... C01b 33/32, C01b 33/26
[58] Field of Search................ 252/194, 179, 455 R, 252/454, 457, 459, 317; 23/110–113; 423/327, 331, 332, 333

[56] References Cited
UNITED STATES PATENTS

| | | | |
|---|---|---|---|
| 3,491,020 | 1/1970 | Carr et al............................ | 252/459 |
| 3,473,890 | 10/1969 | Reinhardt et al.................... | 252/457 |
| 3,573,228 | 3/1971 | Holmes et al....................... | 252/457 |
| 2,489,334 | 11/1949 | Shabaker............................. | 252/457 |
| 2,650,202 | 8/1953 | Hawes et al........................ | 252/457 |
| 2,650,203 | 8/1953 | Hawes et al........................ | 252/457 |

*Primary Examiner*—Leon D. Rosdol
*Assistant Examiner*—Irwin Gluck
*Attorney*—Ralph D. Dinklage and Arnold Sprung

[57] ABSTRACT

Silicate adsorbents and drying agents are prepared by forming precipitation products from aqueous alkali metal silicate solutions and solutions of salts containing di- and trivalent metals. The precipitation product is rendered alkali free and dried. The silicate product contains at least 50 percent by weight silica.

4 Claims, No Drawings

METHOD OF PREPARING SILICATE ADSORBENTS AND DRYING AGENTS AND PRODUCT THEREOF

BACKGROUND

This invention relates to the preparation of silicate adsorbents and drying agents by a precipitation reaction using alkali metal silicate solutions and solutions of salts of di- and trivalent metals and the products from this reaction. Active charcoal, decoloring resins, ion exchangers and natural silicate clay minerals, for instance of the attapulgite or bentonite type, are used for the purification, decoloration, raffination or clarification of contaminated solutions, of wine, beer, juices, whey, sugar solutions, of oils and fats, paraffin, sulphur, solvents and of many liquid chemical reaction products. The silicate clay minerals have special adsorption and decolorizing capacities after thermal or acid activation. The criteria for a good adsorption capacity of these natural and/or activated silicate clay minerals are, among others, a large specific surface area, a high volume of micro-pores up to 800 A, preferably down to 140 A and frequently a pH of the adsorbent in the acid region. Heretofore it was believed that the usefulness of these silicate clay minerals as decolorization agents or adsorbents and as catalysts, or carrier for insecticides, fungicides, catalysts and drying agents, was largely dependent on the morphology of the clay mineral crystals and was a function of their structure.

Also, in preparing synthetic silicate adsorbents and decolorization agents, efforts were made to obtain products having a morphology and structure similar to that of natural adsorbents.

Consequently the synthetic adsorbents were prepared under conditions favorable for a hydrothermal synthesis, i.e. at increased temperatures and pressures.

Furthermore, British Pat. No. 452,247 describes a method for producing a synthetic material having decolorizing properties on the basis of hydrated magnesium silicate which comprises reacting calcium silicates with soluble magnesium compounds under hydrothermal conditions, i.e., at about 230° C or higher. According to an alternative of this method, Portland cement may be reacted with silica hydrate and a magnesium chloride solution at the boiling temperature of said solution under atmospheric pressure. However, the reaction takes 10 hours. The products obtained are said to be comparable with acid-treated clays with respect to their bleaching activity.

SUMMARY

It has now been surprisingly found that silicate adsorbents whose adsorptive capacity corresponds to that of highly active, acid-treated bleaching clays, or is even superior in many cases, and which adsorbents may also be used as drying agents, may be prepared by simple precipitation reactions using alkali metal silicate solutions and solutions of salts of divalent and/or trivalent metals. In this way, it is possible to obtain a large number of new precipitation products which, in view of their higher selectivity may be adapted to the requirements of the respective field of application. Furthermore, these products are surprisingly useful also as drying agents and are superior to many of the known drying agents. Consequently, they may be used in fields of application in which both adsorption effects and drying effects are important.

The present invention relates to a method of preparing new silicate adsorbents and drying agents containing less than 0.1 percent by weight of alkali, having a specific surface of from about 300 to 600 square meters per gram, a fraction of micropores (less than 140 A) of at least about 0.35 ml/g and an ion exchange capacity of from about 15 to about 20 milli equivalents per 100 grams.

The method comprises preparing homogeneous precipitation products from solutions of salts with divalent and/or trivalent cations by means of aqueous alkali metals silicate solutions at room temperature up to the boiling points of the solutions under atmospheric pressure. The precipitation products are substantially rendered alkali-free and dried at temperatures of not more than about 130° C, where the ratio between the alkali metal silicate solution and the salt solution is selected so as to obtain a $SiO_2$-content in the dried precipitation product of at least 50 percent by weight.

DESCRIPTION

Preferably, salt solutions are used which contain $Fe^{++}$, $Mg^{++}$, $Zn^{++}$, $Mn^{++}$, $Al^{+++}$ and/or $Fe^{+++}$ as cations, where the precipitation is preferably carried out using 0.2 – 0.8 molar salt solutions. Suitable the sulfates are used as salts. Nitrates, chlorides and other soluble salts with inorganic or organic acid radicals are also suitable. The alkali metal silicate solution may be either a sodium or potassium water glass solution which is preferably used in a 0.6 to 1.4 molar concentration.

The precipitation is preferably carried out at the boiling point of the solutions, either by adding the salt solution to the alkali metal silicate solution or by adding the alkali metal silicate solution to the salt solution. In order to obtain homogeneous precipitation, the precipitation solution is suitable agitated. Preferably, the alkali silicate solution which has a higher viscosity, is dropwise added to the salt solution. After completion of the precipitation, the precipitate is substantially rendered alkali-free which is usually done first by decantation and subsequently by thorough washing of the filtered precipitate with water so that the finished product contains no more than 0.1 percent by weight of alkali.

The precipitate is subsequently dried under mild conditions where the drying temperature should not be more than 130° C. Usually drying is carried out at about 110° C at atmospheric pressure. The drying can also be carried out at lower temperatures under vacuum.

The dried product is then ground in the usual manner. It may also be treated to form grains or granules.

The adsorption capacity of the products made according to the invention is mainly determined by the specific surface the proportion of micropores. Additional factors include the low residual alkali content and the ion exchange capacity. The adsorptive capacity is favored by a certain ion exchange capacity probably because the electro-negative sites on the surface that are responsible for the ion exchange are especially suitable for the adsorption of charge carriers and of larger molecules. In addition to van der Waals forces, Coulomb forces may also be effective. With a higher ion exchange capacity of more than about 20 milli equivalents per 100 grams, the adsorptive centers that are responsible for the adsorption due to van der Waals forces, would be shielded too excessively by the electro-negative sites. Therefore, not only the size of the surface area but also the structure of the surface is of importance.

The $SiO_2$-content of the precipitation product is also an important factor for the formation of the desired size of the surface area and surface structure and of the proportion of the micropores. The $SiO_2$-content should be at least 50 percent by weight, based on the dry product. Generally, the $SiO_2$-content is between about 50 and 80 percent by weight, preferably between about 60 and 75 percent by weight. The specific surface area and the fraction of the micropores of a typical adsorbent according to the invention (Fe-Mg-mixed silicate) are given below in comparison with those of some known adsorbents (acid-treated, highly active bleaching earth, tradename Tonsil Optimum; naturally active bleaching earth, tradename Tonsil 13 and attapulgite).

|  | Adsorbents according to invention | Tonsil optimum | Tonsil 13 | Atta-pulgite |
|---|---|---|---|---|
| Specific surface area: |  |  |  |  |
| Sq. m./g | 576 | 294 | 121 | 88 |
| Volume of micropores: |  |  |  |  |
| 0-140 A. sq. m./g | 0.468 | 0.367 | 0.081 | 0.175 |
| 0-250 A. sq. m./g | 0.547 | 0.360 | 0.101 | 0.274 |
| 0-800 A. sq. m./g | 0.714 | 0.411 | 0.151 | 0.466 |

The adsorptive power of the precipitation products according to the invention may be improved with respect to degree and selectivity by means of an acid treatment, depending on the particular use. Preferably, mineral acids, especially hydrochloric acid, are used for the acid treatment. Sulfuric acid or nitric acid may also be used.

The acid treatment can be carried out in the precipitation medium. However, it is also possible to carry out the acid treatment with the separated and optionally with the dried precipitation product. The acid treatment probably removes the cations suitable for ion exchange, from the surface, and replaces them by $H^+$ ions. In addition, the volume of the micro-pores is increased by solution processes whereby a larger number of active centers will become available for the adsorption.

The adsorbents according to the invention, in view of their small particle size and large specific surface, and in view of their large fraction of micropores, have an excellent adsorptive power and capacity against dyes such as carotin and chlorophyll from organic (oily) or aqueous phases. It was also found that oils and fats such as linseed oil, cotton oil, soya oil, olive oil, peanut oil, palm oil, mineral oils, paraffins, sulfur etc. may be decolorized, refined and deodorized using the synthetic adsorbents according to the invention. The adsorptive effect of the synthetic adsorbents frequently exceeds that of natural and activated bleaching earth which are commonly used in commercial scale for such decolorizing and refining processes.

The adsorbents according to the invention are also suitable as drying agents. For example, the drying effect of an Fe-Mg-mixed silicate is higher than that of "blue gel" (silica gel with blue color).

The invention is illustrated by the following examples.

EXAMPLE 1

0.3 moles iron-(II)-sulfate is dissolved in 500 ml distilled water and heated to boiling temperature. 0.4 moles of $SiO_2$ in the form of a sodium silicate solution (38.3°Be) diluted with 500 ml distilled water is added dropwise to the boiling solution within a period of about 30 minutes under stirring. The sodium silicate solution used contained 9,4 percent $Na_2O$ and 26,4 percent $SiO_2$ by weight.

Then the reaction product is maintained at the boiling temperature for 4 hours while stirring. Then 400 ml of a 6 percent sodium carbonate solution is slowly added; then 70 ml HCl (specific gravity = 1.158) is added to the boiling suspension, and boiling is continued for 5 minutes. Then the solution is filtered, the filter cake is washed with 400 to 500 ml water, dried at 110° C, ground and sieved through a sieve with openings of 60 microns.

The adsorptive capacity of the obtained product is examined according to the Lovibond-method with cotton oil (neutral). For this purpose, the cotton oil is contacted with 4 percent of the product for 20 minutes at 95° C, and subsequently charged in a cuvette (5 1/4 inches). For comparison, the bleaching activity of an acid-treated activated bleaching earth (Tonsil Optimum) is tested under the same conditions. The following results are obtained:

Lovibond numbers

|  | un-treated oil | Oil Treated with Adsorbent According to Example 1 | Oil Treated With Tonsil Optimum |
|---|---|---|---|
| red | 12.0 | 2.6 | 2.9 |
| yellow | 40.0 | 28.0 | 31.0 |

The adsorbents according to Example 1 is superior to Tonsil Optimum which is considered as one of the best bleaching agents.

EXAMPLE 2

0.2 moles iron-(II)-sulfate is dissolved in 500 ml water and heated to boiling temperature. A sodium silicate solution (38.3°Be) diluted with 500 ml distilled water, in an amount corresponding to 0.4 moles $SiO_2$ is dropwise added with stirring to the boiling solution within a period of about 30 minutes. Then the reaction product is maintained at the boiling temperature for 4 hours with stirring. Then the precipitate is filtered off, washed with 400 to 500 ml water, dried at 110° C, ground and sieved over a sieve having openings of 60 microns.

The adsorptive capacity of the product obtained was tested as in Example 1 in comparison to the adsorptive capacity of Tonsil Optimum; the following results were obtained:

Lovibond numbers

|  | Untreated Cotton Oil (neutral) | Oil Treated With Adsorbent According to Example 2 | Oil Treated With Tonsil Optimum |
|---|---|---|---|
| red | 12.0 | 3.2 | 2.9 |
| yellow | 40.0 | 34.0 | 31.0 |

The product according to Example 2, in contrast to the product of Example 1, was not acid-treated. Nevertheless its bleaching activity approaches that of Tonsil Optimum.

EXAMPLE 3

0.15 moles iron-(II)-sulfate and 0.15 moles magnesium sulfate are dissolved in 500 ml distilled water, heated to the boiling temperature and treated further as described in Example 2.

The adsorptive capacity of the product obtained was tested as in Example 1 in comparison to the adsorptive capacity of Tonsil Optimum; the following results were obtained:

Lovibond numbers

|   | Untreated Cotton Oil (neutral) | Oil Treated With Adsorbent According to Example 3 | Oil Treated With Tonsil Optimum |
|---|---|---|---|
| red | 12.0 | 2.7 | 2.9 |
| yellow | 40.0 | 29.0 | 31.0 |

Although the product according to Example 3 was not treated with acid, its bleaching effect was better than that of Tonsil Optimum.

EXAMPLE 4

0.15 moles of iron-(II)-sulfate and 0.15 moles manganous sulfate are dissolved in 500 ml distilled water, heated to boiling temperature and treated further as described in Example 2.

The adsorptive capacity of the product obtained was tested according to Example 1 in comparison to the adsorptive capacity of Tonsil Optimum; the following results were obtained:

Lovibond Numbers

|   | Untreated Cotton Oil (neutral) | Oil Treated With Adsorbent According To Example 4 | Oil Treated With Tonsil Optimum |
|---|---|---|---|
| red | 12.0 | 2.9 | 2.9 |
| yellow | 40.0 | 15.0 | 31.0 |

Although the product according to Example 4 was not treated with acid, the Lovibond number (red) was equal to that of the Tonsil Optimum, and the Lovibond number (yellow) was even better.

EXAMPLE 5

0.075 moles of iron-(II)-sulfate and 0.225 moles magnesium sulfate are dissolved in 500 ml distilled water, heated to boiling temperature and treated further as described in Example 2.

The adsorptive capacity of the product obtained was tested according to the Lovibond method in comparison to the adsorptive capacity of Tonsil Optimum, Tonsil 13 (activated bleaching earth) with a series of liquids. The results are presented in the following table. inches treatment times and temperatures with the adsorbents are presented in connection with the individual oils. A 5 1/4 cuvette was always used.

The product according to Example 5 generally showed a better performance than the comparative substances.

In addition, the water absorption capacity of the product of Example 5 was determined in comparison to U.S. sub-bentonite, attapulgite and blue gel after 3, 6, and 8 hours at a relative humidity of 32, 67 and 87 percent (20° C). The results are presented in the following table:

WATER ADSORPTION CAPACITY, PERCENT

|  | U.S.-sub-bentonite | | | Attapulgite | | | Blue Gel | | | Adsorbent according to Example 5 | | |
|---|---|---|---|---|---|---|---|---|---|---|---|---|
|  | Relative humidity, percent | | | Relative humidity, percent | | | Relative humidity, percent | | | Relative humidity, percent | | |
|  | 32 | 67 | 87 | 32 | 67 | 87 | 32 | 67 | 87 | 32 | 67 | 87 |
| After 3 hours, percent | 2.6 | 4.0 | 4.0 | 0.6 | 3.3 | 4.3 | 2.4 | 4.7 | 4.8 | 2.9 | 5.7 | 6.1 |
| After 6 hours, percent | 4.3 | 6.8 | 6.4 | 0.7 | 3.9 | 5.3 | 3.9 | 8.0 | 8.7 | 5.0 | 9.6 | 10.5 |
| After 8 hours, percent | 5.4 | 8.3 | 9.3 | 1.0 | 4.1 | 5.7 | 4.9 | 9.9 | 10.7 | 5.3 | 11.2 | 12.5 |

The results show that the product according to Example 5 is superior to blue gel as drying agent.

EXAMPLE 6

0.075 moles magnesium sulfate and 0.225 moles manganous sulfate are dissolved in 50 ml distilled water, heated to boiling temperature and treated further as described in Example 2.

The adsorptive capacity of the product obtained was tested as in Example 1 in comparison to the adsorptive capacity of Tonsil Optimum; the following results were obtained.

Lovibond Numbers

|   | Untreated Cotton Oil (neutral) | Oil Treated with Adsorbent According to Example 6 | Oil Treated with Tonsil Optimum |
|---|---|---|---|
| red | 12.0 | 2.8 | 2.9 |
| yellow | 40.0 | 30.0 | 31.0 |

Although the product of Example 6 was not treated with acid, its bleaching effect was superior to that of Tonsil Optimum.

EXAMPLE 7

0.3 moles of zinc sulfate was dissolved in 500 ml distilled water, heated to boiling temperature and treated further as described in Example 2.

The adsorptive capacity of the product obtained was tested as in Example 1 in comparison to the adsorptive capacities of an activated bleaching earth (Tonsil ACCFF), with the exception, that acid-treated mineral oil was used instead of neutral cotton oil; the mineral oil was treated with 6 percent adsorbent for 30 minutes at 95° C. The determination was carried out with a 1 inch-cuvette.

Lovibond numbers

|  | Untreated liquid | | | Amount of adsorbent, percent | Adsorbent according to Example 5 | | | Tonsil optimum | | | Tonsil 13 | | | Attapulgite | | |
|---|---|---|---|---|---|---|---|---|---|---|---|---|---|---|---|---|
|  | Red | Yellow | Blue |  | Red | Yellow | Blue | Red | Yellow | Blue | Red | Yellow | Blue | Red | Yellow | Blue |
| Carotin, dissolved in white oil | 10.8 | 30.0 |  | 0.5 | 1.2 | 15.0 |  | 6.0 | 30.0 |  | 10.1 | 30.0 |  | 9.3 | 30.0 |  |
| Chlorophyll, dissolved in water | 0.8 | 40.0 | 6.0 | 0.5 | 0.6 | 32.0 | 5.0 | 0.7 | 40.0 | 5.0 | 0.5 | 40.0 | 5.0 | 0.5 | 20.0 | 3.0 |
|  |  |  |  | 1.0 |  | 1.0 | 0.6 | 0.4 | 20.0 | 4.3 | 0.4 | 26.0 | 4.0 |  | 4.0 | 1.2 |
| Linseed oil, raw 30 min., 95° C | 11.0 | 40.0 | 4.0 | 1.6 | 3.0 | 32.0 |  | 4.1 | 40.0 |  | 11.0 | 40.0 | 4.0 | 10.0 | 40.0 | 3.0 |
| Cotton oil, neutral, 20 min., 95° C | 13.0 | 40.0 | 1.0 | 4.0 | 2.4 | 26.0 |  | 2.8 | 30.0 |  | 8.1 | 40.0 |  | 4.5 | 40.0 |  |
| Soya oil, neutral 20 min., 95° C | 7.4 | 40.0 |  | 1.0 | 1.3 | 15.0 |  | 1.2 | 14.0 |  | 7.0 | 40.0 |  | 4.0 | 40.0 |  |
| Olive oil, neutral 20 min., 95° C | 2.0 | 30.0 | 2.0 | 1.0 | 1.0 | 13.0 |  | 0.7 | 11.0 |  | 1.6 | 24.0 | 1.0 | 1.1 | 14.0 |  |
| Peanut oil, neutral, 20 min., 95° C | 1.0 | 12.0 |  | 1.0 | 0.7 | 9.0 |  | 0.6 | 8.0 |  | 0.8 | 12.0 |  | 2.1 | 20.0 |  |
| Mineral oil, acid-treated, 30 min., 95° C | (1) | (1) | (1) | 6.0 | 1.5 | 17.0 |  | 1.2 | 14.0 |  | 7.2 | 40.0 | 1.0 | 3.8 | 40.0 |  |
| Caraffin, 30 min., 95° C | 30.0 | 40.0 | 10.0 | 1.0 | 3.6 | 38.0 |  | 5.5 | 40.0 |  | 21.0 | 40.0 | 5.0 | 6.1 | 40.0 |  |

[1] Could not be determined, too dark.

Lovibond Numbers

|  | Acid-treated Mineral Oil, Otherwise Untreated | Oil Treated with Adsorbent According to Example 7 | Oil Treated with Tonsil ACCFF |
|---|---|---|---|
| red | could not be determined (too dark) | 1.5 | 1.8 |
| yellow |  | 17.0 | 20.0 |

The product according to Example 7 showed a superior bleaching effect even with heavily contaminated mineral oil as compared to the activated bleaching earth which was preferably used for this oil up to now.

EXAMPLE 8

0.2 moles iron-(III)-chloride are dissolved in 500 ml distilled water and heated to boiling temperature. 1 liter of a 1-molar sodium silicate solution was dropwise added to the boiling solution within a period of about 30 minutes. Then the reaction product is maintained at the boiling temperature for 4 hours while stirring. The precipitate is treated further as described in Example 2 (product A without acid treatment).

A second charge is prepared as described above. The reaction product, after a boiling time of 4 hours, is treated as described in Example 1 (product B, with acid treatment).

The adsorptive capacity of the products obtained was tested according to the Lovibond method as described in Example 1. The following results were obtained.

Lovibond Numbers

|  | Untreated Cotton Oil (neutral) | Oil Treated with Product A | Oil Treated with Product B |
|---|---|---|---|
| red | 12.0 | 5.3 | 3.8 |
| yellow | 40.0 | 40.0 | 40.0 |

The results show that the bleaching effect is improved by the acid treatment.

EXAMPLE 9

0.3 moles aluminum sulfate are dissolved in 500 ml distilled water, heated to boiling temperature and treated further as described in Example 2.

The adsorptive capacity of the product obtained was tested as in Example 5 in comparison to naturally active bleaching earth Tonsil 13 and attapulgite; the following results were obtained:

Lovibond Numbers

|  | Untreated Cotton Oil (neutral) | Oil Treated with Adsorbent according to Example 9 | Oil Treated with Tonsil 13 | Oil Treated with Attapulgite |
|---|---|---|---|---|
| red | 13.0 | 4.4 | 8.1 | 4.5 |
| yellow | 40.0 | 40.0 | 40.0 | 40.0 |
| blue | 1.0 | — | — | — |

The bleaching effect of the product according to Example 9 is superior to that of Tonsil 13 and is about equal to that of attapulgite.

EXAMPLE 10

0.3 moles of iron-(II)-sulfate is dissolved in 500 ml distilled water and mixed with 0.4 moles of $SiO_2$ in the form of a sodium silicate solution of 38.3°Be diluted with 500 ml distilled water, at room temperature for about 3 minutes. Then the reaction product is maintained at 70° C for 4 hours while stirring. Then the precipitate is filtered off, washed with 400 to 500 ml water, dried at 110° C, ground and sieved over a sieve having openings of 60 microns.

The adsorptive capacity of the product obtained was tested as in Example 1 in comparison to the adsorptive capacity of Tonsil Optimum; the following results were obtained:

Lovibond Numbers

|  | Untreated Cotton Oil (neutral) | Oil Treated with Adsorbent according to Example 10 | Oil Treated with Tonsil Optimum |
|---|---|---|---|
| red | 12.0 | 3.1 | 2.9 |
| yellow | 40.0 | 33.0 | 31.0 |

If the product according to Example 10 is treated with acid, the bleaching effect of Tonsil Optimum is reached.

EXAMPLE 11

0.3 moles iron-(II)-sulfate is dissolved in 500 ml distilled water and to this solution is added dropwise under stirring for 10 minutes, 0.4 mol $SiO_2$ in the form of a sodium silicate solution of 38.3°Be diluted with 500 ml distilled water. Then the reaction product is maintained at room temperature (about 20° C) for 4 hours with stirring. Then the precipitate is filtered off, washed with 400 to 500 ml water, dried at 110° C, ground and sieved through a sieve having openings of 60 microns.

The adsorptive capacity of the product obtained was tested as in Example 1 in comparison to the adsorptive capacity of Tonsil Optimum; the following results were obtained:

Lovibond Numbers

|  | Untreated Cotton Oil (neutral) | Oil Treated with Adsorbent according to Example 11 | Oil Treated with Tonsil Optimum |
|---|---|---|---|
| red | 12.0 | 3.2 | 2.9 |
| yellow | 40.0 | 34.0 | 31.0 |

Although the reaction product was prepared at room temperature its bleaching effect was only slightly less than that of Tonsil Optimum.

EXAMPLE 12

The adsorptive capacity of the adsorbent according to Example 1 with respect to egg albumen according to the International Codex for Wine Treating Agents was tested, using an aqueous solution, in comparison with the adsorptive capacity of Tonsil 13, attapulgite and Tonsil Optimum. The adsorbents were used in amounts of 1 g/liter each. After a contact time of 24 hours the following results were obtained:

|  | Residual Amount of Albumen in the Solution (mg/liter) |
|---|---|
| initial value | 579 |
| Tonsil 13 | 508 |
| attapulgite | 505 |
| Tonsil Optimum | 476 |
| adsorbent according to Example 1 | 368 |

Synthetic adsorbents and drying agents may be prepared from water-soluble salts of all divalent and trivalent cations and mixtures thereof, using the procedures illustrated in the Examples. Likewise, salt solutions obtained in industrial processes such as waste liquors in the manufacture of bleaching earth or mordant liquors in the metal industry are suitable as starting materials for the preparation of the synthetic adsorbent and drying agents according to the invention.

What is claimed is:

1. Process for preparing a silicate adsorbent and drying agent which comprises mixing an aqueous solution of an alkali metal silicate and a solution consisting essentially of a water and a metal salt containing di- or trivalent cation selected from the group consisting of $Fe^{++}$, $Mg^{++}$, $Zn^{++}$, $Mn^{++}$, $Al^{+++}$ and $Fe^{+++}$, said mixing being carried out at a temperature of about room temperature to the boiling point of the solution, rendering the precipitation product which forms from said mixing substantially alkali-free and thereafter drying said product at a temperature not greater than 130° C; said dried precipitation product having a silica content of between about 50 and 80 percent by weight, an alkali content of less than about 0.1 percent by weight, a specific surface area of about 300 to 600 sq.m/g., a fraction of micropores, less than 140 A, of at least about 0.35 ml/g and an ion exchange capacity of about 15 to 20 milliequivalents per 100 g.

2. Process of claim 1 wherein 0.2 to 0.8 molar metal salt solutions are used for the precipitation.

3. Process of claim 1 wherein 0.6 to 1.4 molar alkali metal silicate solutions are used for the precipitation.

4. Process of claim 1 wherein the precipitation product is treated with an acid.

* * * * *